United States Patent
Gao et al.

(10) Patent No.: US 10,210,045 B1
(45) Date of Patent: Feb. 19, 2019

(54) REDUCING CONCURRENCY BOTTLENECKS WHILE REBUILDING A FAILED DRIVE IN A DATA STORAGE SYSTEM

(71) Applicant: EMC IP Holding Company LLC, Hopkinton, MA (US)

(72) Inventors: Jian Gao, Beijing (CN); Lili Chen, Hopkinton, MA (US); Qingyun Liu, Beijing (CN); Ree Sun, Beijing (CN); Shaoqin Gong, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 125 days.

(21) Appl. No.: 15/498,609

(22) Filed: Apr. 27, 2017

(51) Int. Cl.
G06F 11/00 (2006.01)
G06F 11/10 (2006.01)
G06F 11/16 (2006.01)

(52) U.S. Cl.
CPC ...... G06F 11/1092 (2013.01); G06F 11/1666 (2013.01); G06F 2201/805 (2013.01)

(58) Field of Classification Search
CPC .... G06F 3/0619; G06F 3/0665; G06F 3/0689; G06F 11/1084; G06F 11/1092; G06F 11/1666
See application file for complete search history.

(56) References Cited

U.S. PATENT DOCUMENTS

| | | | |
|---|---|---|---|
| 5,579,475 A | 11/1996 | Blaum et al. | |
| 6,405,284 B1* | 6/2002 | Bridge | G06F 3/0608 711/114 |
| 6,567,889 B1 | 5/2003 | DeKoning et al. | |
| 6,857,059 B2 | 2/2005 | Karpoff et al. | |
| 7,409,625 B2 | 8/2008 | Corbett et al. | |
| 7,603,529 B1* | 10/2009 | MacHardy | G06F 3/0608 707/999.202 |

(Continued)

OTHER PUBLICATIONS

Blaum, et al., "EVENODD: An Optical Scheme for Tolerating Double Disk Failures in RAID Architectures", RAID Architectures: IBM Research Report, RJ 9506, Sep. 1993, pp. 245-254.

(Continued)

*Primary Examiner* — Joshua P Lottich
(74) *Attorney, Agent, or Firm* — BainwoodHuang

(57) ABSTRACT

A concurrent rebuild list indicates RAID extents to be concurrently rebuilt in response to a physical drive failure. When rebuilding of a RAID extent in the list completes, a next RAID extent to add to the list is selected that has a lowest relatedness score in a candidate set of RAID extents. The relatedness score indicates an amount of limitation with regard to concurrently rebuilding the candidate RAID extent in combination with the RAID extents remaining in the concurrent rebuild list. The relatedness score may be a sum of a weighted write score indicating limits on concurrent write operations when rebuilding a candidate RAID extent in combination with the RAID extents remaining in the concurrent rebuild list, and a read score indicating limits on concurrent read operations when rebuilding the candidate RAID extent in combination with the RAID extents remaining in the concurrent rebuild list.

18 Claims, 9 Drawing Sheets

(56) References Cited

U.S. PATENT DOCUMENTS

| | | | |
|---|---|---|---|
| 8,473,566 B1* | 6/2013 | Cardente | G06F 3/061 370/252 |
| 9,563,511 B1* | 2/2017 | Foley | G06F 11/1092 |
| 9,690,660 B1* | 6/2017 | Robins | G06F 11/1088 |
| 2004/0260967 A1 | 12/2004 | Guha et al. | |
| 2006/0075283 A1 | 4/2006 | Hartung et al. | |
| 2006/0107013 A1* | 5/2006 | Ripberger | G06F 3/0605 711/170 |
| 2008/0010494 A1* | 1/2008 | Takizawa | G06F 11/0727 714/5.1 |
| 2009/0254636 A1* | 10/2009 | Acedo | G06F 3/0607 709/220 |
| 2012/0137065 A1 | 5/2012 | Odenwald et al. | |
| 2013/0073900 A1* | 3/2013 | Li | G06F 11/1092 714/6.22 |
| 2014/0164849 A1* | 6/2014 | Floeder | G06F 11/004 714/47.2 |
| 2015/0205668 A1* | 7/2015 | Sundaram | G11C 29/52 714/6.24 |
| 2015/0286531 A1* | 10/2015 | Bondurant | G11B 5/012 714/6.23 |
| 2016/0170851 A1* | 6/2016 | Goldberg | G06F 11/2069 714/6.24 |

OTHER PUBLICATIONS

Miller, Scott A., "Comparing RAID 10 and RAID 01", SMB IT Journal; Jul. 30, 2014; <<http://www.smbitjournal.com/2014/07/comparing-raid-10-and-raid-01>>article accessed Mar. 21, 2017, 6 pages.

Patterson, et al., "A Case for Redundant Arrays of Inexpensive Disks (RAID)", Proceedings of the 1988 ACM SIGMOD International Conference on Management of Data, ACM, 1988, pp. 109-116.

Perumal, et al., "A Tutorial on RAID Storage Systems", CS04-05-00. May 6, 2004. Data Network Architectures Group. Department of Computer Science. University of Capetown, 23 pages.

* cited by examiner

| RAID EXTENT INDEX | DRIVE # OF FIRST DRIVE EXTENT | DRIVE # OF SECOND DRIVE EXTENT | DRIVE # OF THIRD DRIVE EXTENT | DRIVE # OF FOURTH DRIVE EXTENT | DRIVE # OF FIFTH DRIVE EXTENT | DRIVE NUMBER OF ALLOCATED SPARE DRIVE EXTENT | RELATEDNESS SCORE |
|---|---|---|---|---|---|---|---|
| 0 | 0 | 2 | 3 | 4 | 5 | 1 | |
| 1 | 1 | 6 | 7 | 0 | 3 | 2 | |
| 2 | 2 | 5 | 0 | 4 | 7 | 3 | |
| 3 | 6 | 3 | 5 | 1 | 0 | 2 | 7 |
| 4 | 4 | 2 | 3 | 5 | 1 | 1 | 6 |
| 5 | 0 | 7 | 6 | 4 | 3 | | |
| 6 | 3 | 1 | 4 | 2 | 6 | 4 | 5 |
| 7 | 7 | 0 | 2 | 6 | 5 | 5 | 5 |
| 8 | 6 | 1 | 1 | 0 | 4 | | |
| 9 | 7 | 4 | 1 | 3 | 2 | | |
| ... | ... | ... | ... | ... | ... | ... | ... |

TABLE 300

Fig. 3

REDUCING CONCURRENCY BOTTLENECKS WHILE REBUILDING A FAILED DRIVE IN A DATA STORAGE SYSTEM

TECHNICAL FIELD

The present disclosure relates generally to intelligent data storage systems, and more specifically to technology for reducing concurrency bottlenecks while rebuilding a failed storage drive in a data storage system.

BACKGROUND

Data storage systems are arrangements of hardware and software that typically include multiple storage processors coupled to arrays of non-volatile data storage devices, such as magnetic disk drives, electronic flash drives, and/or optical drives. The storage processors service host I/O operations received from host machines. The received I/O operations specify one or more storage objects (e.g. logical disks or "LUNs") that are to be written, read, created, or deleted. The storage processors run software that manages incoming I/O operations and that performs various data processing tasks to organize and secure the host data that is received from the host machines and stored on the non-volatile data storage devices.

Some existing data storage systems have supported RAID (Redundant Array of Independent Disks) technology. As it is generally known, RAID is a data storage virtualization/protection technology that combines multiple physical drives into a single logical unit to provide data redundancy and/or performance improvement. Data may be distributed across the drives in one of several ways, referred to as RAID levels, depending on the required levels of redundancy and performance. Some RAID levels employ data striping ("striping") to improve performance. In general, striping involves segmenting received host data into logically sequential blocks, and then storing consecutive blocks in the logical sequence of blocks onto different drives. A series of consecutive logically sequential data blocks that are stored across different drives is referred to as a RAID "stripe". By spreading data segments across multiple drives that can be accessed concurrently, total data throughput can be increased.

Some RAID levels additionally employ a "parity" error protection scheme to provide fault tolerance. When parity protection is used, an additional parity block is maintained in each stripe. For example, a parity block for a stripe may be maintained that is the result of performing a bitwise exclusive "OR" (XOR) operation across the data blocks of the stripe. When the storage for a data block in the stripe fails, e.g. due to a drive failure, the lost data block can be recovered by performing an XOR operation across the remaining data blocks and the parity block.

One typical RAID configuration that uses block level striping with distributed parity error protection is 4D+1P ("four data plus one parity") RAID-5. In 4D+1P RAID-5, each stripe consists of 4 data blocks and a block of parity information. In a traditional 4D+1P RAID-5 disk group, at least five storage disks are used to store the data and parity information, so that each one of the four data blocks and the parity information for each stripe can be stored on a different disk. A spare drive is also kept available to handle disk failures. In the event that one of the disks storing data fails, the data stored on the failed disk can be rebuilt onto the spare disk by performing XOR operations on the remaining data blocks and the parity information on a per-stripe basis.

SUMMARY

Previous data storage systems that have included RAID technology have exhibited significant shortcomings with regard to the time required to rebuild in the event of a disk failure. For example, as disk capacity has increased with the introduction of new storage technologies, the time required to rebuild the data from an entire failed disk onto a spare disk has also increased, and the write bandwidth of the spare disk has become a significant performance bottleneck with regard to total rebuild time. Moreover, while the data from a failed disk is being rebuilt onto a spare disk, a failure of one of the remaining functional disks during that rebuilding time period constitutes a double disk failure, potentially resulting in data loss.

Mapped RAID groups can address the problem of increased rebuild times caused by the write bandwidth bottleneck of a dedicated spare disk. In a mapped RAID group approach, physical drives are divided into drive extents that are allocated from a drive extent pool to the mapped RAID group. A mapping table for the RAID group organizes the allocated drive extents into RAID extents. Each RAID extent indicates a set of drive extents allocated from the drive extent pool, and each drive extent allocated to a given RAID extent is located on a different physical drive. The drive extents within a RAID extent are used to store the data blocks and parity information for a stripe represented by the RAID extent. Accordingly, the number of drive extents indicated by each RAID extent is the same as the number of drives used in traditional RAID to store data blocks and parity information for the same RAID configuration. For example, in a mapped RAID group supporting a 4D+1P RAID-5 configuration, each RAID extent indicates a total of five drive extents that are used to store the four data blocks and the parity information block of the stripe represented by the RAID extent.

In the event that a drive fails when using mapped RAID, spare drive extents can be allocated from multiple physical drives contributing to the drive extent pool in order to replace the drive extents from the failed drive, thus spreading the rebuild read and write operations across multiple physical drives, and eliminating the write bandwidth bottleneck previously caused in traditional RAID by rebuilding onto a single spare physical drive. In this way, mapped RAID can significantly reduce rebuild time in the face of a single drive failure.

Mapped RAID technologies may still experience a drive rebuilding performance bottleneck if spare drive extents from the drive extent pool are used to replace a failed drive in such a way that the amount of concurrent processing that can be performed during the rebuild process is limited. For example, when attempting to concurrently rebuild two drive extents of a failed drive using two spare drive extents that are located on a single physical drive, the write bandwidth of the single physical drive may introduce a performance bottleneck with regard to write operations required to write the host data that was previously stored on the disk extents of the failed drive to the spare drive extents. A similar rebuilding performance bottleneck may be introduced if two drive extents storing host data or parity information that must be read to restore host data that was previously stored on a drive extent of the failed drive are located on the same physical drive.

To address these and other shortcomings of previous systems, technology is disclosed herein for providing RAID (Redundant Array of Independent Disks) data protection for a storage object in a data storage system. The data storage system includes a storage processor and a set of physical drives communicably coupled to the storage processor. A RAID mapping table is generated that contains multiple RAID extents. Each RAID extent in the RAID mapping table indicates multiple drive extents for storing host data written to the storage object, as well as related parity information, and each drive extent is a contiguous region of non-volatile data storage in one of the physical drives.

In response to detecting that one of the physical drives has failed, the disclosed technology concurrently rebuilds RAID extents in a concurrent rebuild list. Each RAID extent in the concurrent rebuild list indicates a drive extent of the failed physical drive. For each one of the RAID extents in the concurrent rebuild list, the rebuilding includes i) recovering host data previously stored in the drive extent of the failed one of the physical drives indicated by the RAID extent, and ii) writing the recovered host data to a spare drive extent allocated to the RAID extent.

In response to detecting that rebuilding of one of the RAID extents in the concurrent rebuild list has completed, that one of the RAID extents is removed from the concurrent rebuild list. A next RAID extent is selected to replace the RAID extent that was removed from the concurrent rebuild list in the concurrent rebuild list by i) forming a candidate set of RAID extents, where each RAID extent in the candidate set indicates a drive extent of the failed physical drive, ii) calculating a relatedness score for each RAID extent in the candidate set with respect to the RAID extents remaining in the concurrent rebuild list, where the relatedness score indicates an amount of limitation with regard to concurrently rebuilding the RAID extent in combination with the RAID extents remaining in the concurrent rebuild list, and iii) selecting as the new RAID extent to replace the removed RAID extent in the concurrent rebuild list a RAID extent in the candidate set having a lowest relatedness score of the RAID extents in the candidate set.

In another aspect of the disclosed technology, calculating a relatedness score for each RAID extent in the candidate set may include, for each RAID extent in the candidate set, i) creating a candidate concurrent rebuild list for the candidate RAID extent, the candidate concurrent rebuild list being made up of the candidate RAID extent and the RAID extents remaining in the concurrent rebuild list, and ii) calculating a write score for the candidate RAID extent that is equal to a total number of pairs of spare drive extents in which both spare drive extents of the pair are both a) allocated to the RAID extents in the candidate concurrent rebuild list, and b) located within a single one of the physical drives. Calculating the relatedness score for each candidate RAID extent may be based at least in part on such a write score for the candidate RAID extent.

In another aspect of the disclosed technology, calculating the relatedness score for each candidate RAID extent may include calculating a read score for the candidate RAID extent that is equal to a total number of pairs of drive extents in which both drive extents of the pair are both i) indicated by the RAID extents in the candidate concurrent rebuild list, and ii) located within a single one of the physical drives. Calculating the relatedness score for each candidate RAID extent may be performed by generating a sum of the write score for the candidate RAID extent and the read score for the candidate RAID extent.

In another aspect of the disclosed technology, prior to generating the sum of the write score for the candidate RAID extent and the read score for the candidate RAID extent, a write score weighting may be applied to the write score for the candidate RAID extent. The write score weighting causes the write score for each candidate RAID extent to be more heavily weighted than the candidate RAID extent's read score in the relatedness score for the candidate RAID extent.

In another aspect of the disclosed technology, concurrently rebuilding the RAID extents in the concurrent rebuild list may include concurrently reading drive extents indicated by different ones of the RAID extents in the concurrent rebuild list to recover host data previously stored on drive extents of the failed physical drive.

In another aspect of the disclosed technology, concurrently rebuilding the RAID extents in the concurrent rebuild list may include concurrently writing spare drive extents allocated to different ones of the RAID extents in the concurrent rebuild list with recovered host data previously stored on the drive extents of the failed physical drive.

Embodiments of the disclosed technology may provide significant advantages over previous technical solutions. In order to reduce the time required to rebuild data in the event of a single drive failure, the disclosed technology avoids rebuilding concurrency bottlenecks that limit the amount of concurrent processing that can be performed during the rebuild process. The disclosed technology avoids attempting to concurrently rebuild multiple RAID extents indicating drive extents of a failed drive using spare drive extents that are located on a single physical drive. The disclosed technology will also avoid attempting to concurrently rebuild multiple RAID extents indicating drive extents of a failed drive that also indicate remaining drive extents located on a single physical drive that store host data or parity information that must be read to recover the host data that was previously stored on drive extents of the failed drive. By increasing concurrent processing during the rebuild process, and thereby reducing the time required to rebuild data in response to a single drive failure, the disclosed technology reduces the risk of data loss during that time period as a result of one of the remaining functional drives also failing.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 is a table illustrating an example of a use case during operation of some embodiments of the disclosed technology;

DETAILED DESCRIPTION

Embodiments of the invention will now be described. It should be understood that the embodiments described below are provided only as examples, in order to illustrate various features and principles of the invention, and that the invention is broader than the specific embodiments described below.

Figure 1:
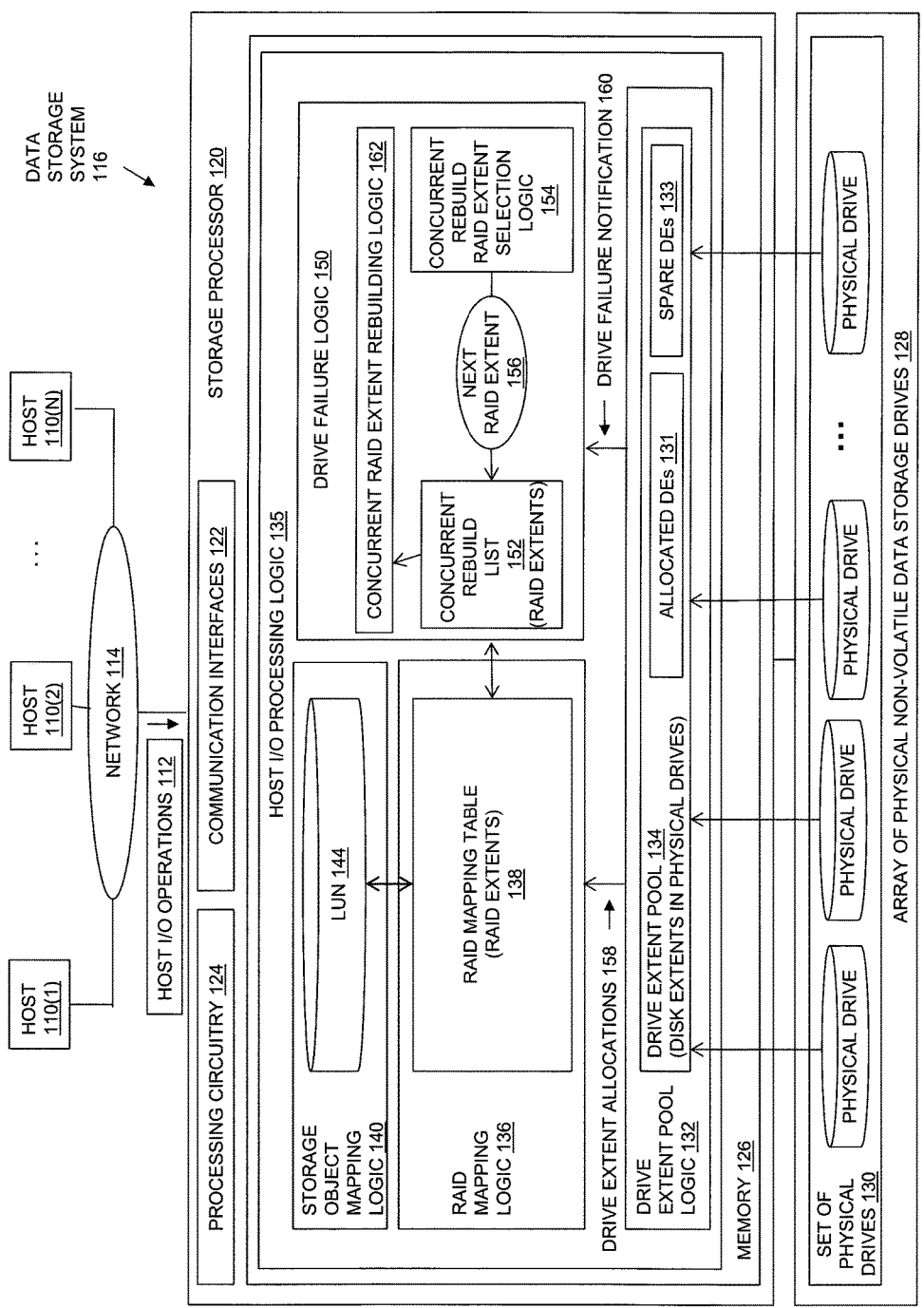
FIG. 1 is a block diagram showing an operational environment for the disclosed technology, including an example of a data storage system in which the disclosed technology may be embodied.

FIG. 1 is a block diagram showing an operational environment for the disclosed technology, including an example of a data storage system in which embodiments of the disclosed technology may be embodied. The data storage environment of FIG. 1 includes some number of Host Computing Devices 110, referred to as "hosts" and shown for purposes of illustration by Hosts 110(1) through 110(N), that access data storage provided by Data Storage System 116, for example over one or more computer networks, such as a local area network (LAN), and/or a wide area network (WAN) such as the Internet, etc., shown in FIG. 1 by Network 114. Data Storage System 116 includes at least one Storage Processor 120 and an Array of Non-Volatile Data Storage Drives 128. Storage Processor 120 may, for example, be provided as a circuit board assembly, or "blade," which plugs into a chassis that encloses and cools multiple storage processors, and that has a backplane for interconnecting storage processors. However, no particular hardware configuration is required, and Storage Processor 120 may be embodied as any specific type of computing device capable of processing host input/output (I/O) operations received from Hosts 110 (e.g. I/O read and I/O write operations, create storage object operations, delete storage object operations, etc.).

The Array of Non-Volatile Data Storage Drives 128 may include magnetic disk drives, solid state drives, hybrid drives, and/or optical drives. Array of Non-Volatile Data Storage Drives 128 may be directly physically connected to and/or contained within Storage Processor 120, and/or may be communicably connected to Storage Processor 120 by way of one or more computer networks, e.g. including or consisting of a Storage Area Network (SAN) or the like.

A Memory 126 in Storage Processor 120 stores program code that is executable on Processing Circuitry 124. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is configured and arranged to carry out various methods and functions as described herein. The Memory 126 stores a variety of software components that may be provided in the form of executable program code. For example, as shown in FIG. 1, Memory 126 may include software components such as Host I/O Processing Logic 135. When the program code is executed by Processing Circuitry 124, Processing Circuitry 124 is caused to carry out the operations of the software components. Although certain software components are shown and described for purposes of illustration and explanation, those skilled in the art will recognize that Memory 126 may include various other software components, such as an operating system, various applications, processes, etc.

During operation, Drive Extent Pool Logic 132 generates Drive Extent Pool 134 by dividing each one of the physical drives in the Set of Physical Drives 130 into multiple, equal size drive extents, each of which consists of physically contiguous non-volatile data storage located on a drive. For example, Drive Extent Pool Logic 132 may divide each one of the physical drives into a fixed number of equal size drive extents of physically contiguous non-volatile storage, and add each one of the resulting drive extents to Drive Extent Pool 134. Individual ones of the drive extents in Drive Extent Pool 134 may initially be i) allocated to the Mapped RAID Group 138 (e.g. Allocated Drive Extents 131), e.g. when Mapped RAID Group 138 is created, or ii) "spare" drive extents (e.g. Spare Drive Extents 133) that are available for future allocation to Mapped RAID Group 138 in response to a failure condition, e.g. to replace drive extents located in a failed drive in the Set of Physical Drives 130.

The Set of Physical Drives 130 from which Drive Extent Pool 134 is generated may consist of all the physical non-volatile data storage drives in Array of Physical Non-Volatile Data Storage Drives 128, or only a subset of the physical non-volatile data storage drives in Array of Physical Non-Volatile Data Storage Drives 128. Accordingly, the disclosed techniques may be embodied such that Array of Physical Non-Volatile Data Storage Drives 128 includes multiple separate sets of physical drives, each one of which may be used to independently generate a separate pool of drive extents.

The size of the drive extents into which the physical drives in the Set of Physical Drives 130 are divided is the same for every physical drive in the Set of Physical Drives 130. Various specific sizes of drive extents may be used in different embodiments. For example, in some embodiments each drive extent may have a size of 10 gigabytes. Larger or smaller drive extent sizes may be used in the alternative. Any specific number of physical drives may be contained in the Set of Physical Drives 130 and divided into equal size drive extents to generate Drive Extent Pool 134, so long as the number of physical drives is larger than the Requested RAID Width 150. The physical drives in the Set of Physical Drives 130 may each have the same total capacity, and may accordingly each be divided into the same number of drive extents. Alternatively, the physical drives in Set of Physical Drives 130 may have a variety of different capacities, resulting in different physical drives being divided into different numbers of equal size drive extents.

After dividing each one of the physical drives in the Set of Physical Drives 130 into multiple, equal size drive extents of physically contiguous non-volatile data storage, and adding the drive extents to Drive Extent Pool 134, drive extents may be allocated to specific RAID extents contained in Mapped RAID Group 138, to be used to store data directed to the RAID extents to which they are allocated, as shown at reference number 158 of FIG. 1. For example, a drive extent may be allocated from Drive Extent Pool 134 to a specific RAID extent contained in Mapped RAID Group 138 in response to an allocation request from RAID Group Mapping Logic 136, e.g. when Mapped RAID Group 138 is created, or subsequently to replace a drive extent of a failed drive, and thereafter used to store host data directed to that specific RAID extent. A drive extent may be deallocated from a specific RAID extent back to Drive Extent Pool 134, and thereby made available for allocation to a different RAID extent, in response to a deallocation request from RAID Group Mapping Logic 136, e.g. when the drive extent is no longer needed. Some number of drive extents in Drive Extent Pool 134 are "spare" drive extents (e.g. Spare Drive Extents 133), and available for immediate allocation to Mapped RAID Group 138 in order to promptly replace failed drive extents in the event of a drive failure.

Each drive extent may be indicated by way of a pair of indexes "m|n", in which "m" indicates a drive index of the physical drive on which the drive extent is located (e.g. a numeric drive number, a slot number within which the physical drive located, or a textual drive name, etc.), and "n" indicates an index of the drive extent within the physical drive (e.g. a numeric drive extent number, a block offset, a sector number, etc.). For example, in embodiments in which physical drives are indexed within Set of Physical Drives 130 starting with 0, and in which drive extents are indexed within the physical drive that contains them starting with 0, a first drive extent of a first drive within Set of Physical Drives 130 may be represented by "0|0", a second drive extent within the first drive within Set of Physical Drives 130 may be represented by "0||", and so on.

Host I/O Processing Logic 135 exposes one or more logical storage objects to Hosts 110 for reading and/or writing data, so that Hosts 110 can issue Host I/O Operations 112 to specific storage objects, e.g. using names or other identifiers of the storage objects. The storage objects exposed to Host I/O Operations 112 may be written, read, created, and/or deleted by Hosts 110 through Host I/O Operations 112. The storage objects exposed to Hosts 110 may include or consist of logical disks sometimes referred to as "LUNs", such as LUN 144. The storage objects exposed to Hosts 110 may alternatively include or consist of a host file system, virtual volume, and/or some other type of storage object, which Host I/O Processing Logic 135 makes accessible to Hosts 110 for reading and/or writing data.

Storage Object Mapping Logic 140 directs host data written to sets of consecutive blocks in a logical address space of LUN 144 to specific corresponding RAID extents in RAID Mapping Table 138, so that the host data written to a set of consecutive blocks in the logical address space can be persistently stored by drive extents indicated by the corresponding RAID extent, and so that parity information can be calculated and stored in one of the drive extents of the corresponding RAID extent to support data recovery. For example, an address space of LUN 144 may be made up of a set of sequential, equal size logical blocks. Each host write I/O operation may indicate a specific block to be written within the address space of the LUN 144, e.g. using a logical block number or offset into LUN 144. In some embodiments, 4D+1P RAID-5 block level striping with distributed parity error protection may be used, with each RAID stripe consisting of four data blocks and a block of parity information, and each RAID stripe being represented by and mapped to drive extents of physical storage by a single RAID extent. In such embodiments, each RAID extent may indicate five drive extents. For each set of four consecutive blocks in the logical address space of LUN 144 that are mapped to a single given RAID extent, host data is striped across the disk extents indicated by that RAID extent by storing host data written to consecutive ones of the four consecutive blocks of the logical address space into different ones of four of the drive extents indicated by that RAID extent. Parity information is calculated and stored in a fifth one of the drive extents indicated by the RAID extent, e.g. as an XOR of the host data stored in the other four drive extents indicated by the RAID extent. In this way, host data stored in any one of the four drive extents indicated by the RAID extent that store host data can be recovered in the event of a failure of a physical drive containing one of the four drive extents indicated by the RAID extent that store host data, for example by performing one or more XOR operations on the host data stored in the three surviving drive extents indicated by the RAID extent that store host data in combination with the parity information stored in the fifth drive extent indicated by the RAID extent.

Further during operation, Drive Extent Pool Logic 132 may detect that one of the physical drives in the Set of Physical Drives 130 has failed, and issue Drive Failure Notification 160 to Drive Failure Logic 150. Also in response to detecting that one of the physical drives in the Set of Physical Drives 130 has filed, Drive Extent Pool Logic 132 and/or RAID Mapping Logic 136 may allocate one of the spare drive extents in Spare Drive Extents 133 to each one of the RAID extents in RAID Mapping Table 138 that indicates a drive extent located in the failed physical drive.

In response to Drive Failure Notification 160, Drive Failure Logic 160 may cause Concurrent RAID Extent Rebuilding Logic 162 to begin concurrently rebuilding RAID extents in RAID Mapping Table 138 that are indicated by Concurrent Rebuild List 152. Each RAID extent in Concurrent Rebuild List 152 indicates a drive extent located in the failed physical drive. An initial set of RAID extents in RAID Mapping Table 138 may be selected, e.g. by Concurrent Rebuild RAID Extent Logic Selection Logic 154, that includes the lowest numbered RAID extents in RAID Mapping Table 138 that indicate a drive extent located in the failed physical drive.

Concurrent RAID Extent Rebuilding Logic 162 rebuilds each one of the RAID extents indicated by Concurrent Rebuild List 152 by i) recovering host data previously stored in the drive extent of the failed one of the physical drives indicated by that RAID extent, and ii) writing the recovered host data to a spare drive extent allocated to the RAID extent.

For example, in some embodiments, concurrently rebuilding the RAID extents indicated by the Concurrent Rebuild List 152 may include or consist of concurrently reading drive extents indicated by different ones of the RAID extents indicated by the concurrent rebuild list, in order to recover host data previously stored on drive extents of the failed physical drive.

In another example, in some embodiments, concurrently rebuilding the RAID extents indicated by the Concurrent Rebuild List 152 may include or consist of concurrently writing spare drive extents allocated to different ones of the RAID extents in the concurrent rebuild list with recovered host data previously stored on the drive extents of the failed one of the physical drives.

In response to detecting that rebuilding of one of the RAID extents in Concurrent Rebuild List 152 has completed, Concurrent RAID Extent Rebuilding Logic 162 may remove that one of the RAID extents from Concurrent Rebuild List 152, and Concurrent Rebuild RAID Extent Selection Logic 154 may select a Next RAID Extent 156 to replace the RAID extent removed from Concurrent Rebuild List 152.

Concurrent Rebuild RAID Extent Selection Logic 154 may select Next RAID Extent 156 by first forming a candidate set of RAID extents, wherein each RAID extent in the candidate set has not been rebuild, and indicates a drive extent that is located the failed physical drive. Concurrent Rebuild RAID Extent Selection Logic 154 then calculates a relatedness score for each RAID extent in the candidate set with respect to the RAID extents remaining in the Concurrent Rebuild List 152. The relatedness score for each RAID extent in the candidate set indicates an amount of limitation with regard to concurrently rebuilding that RAID extent in combination with the RAID extents remaining in the Concurrent Rebuild List 152. The Concurrent Rebuild RAID Extent Selection Logic 154 then selects as the Next RAID Extent 156, to replace the RAID extent removed from Concurrent Rebuild List 152, the RAID extent in the candidate set that has the lowest relatedness score of all the RAID extents in the candidate set.

In some embodiments, Concurrent Rebuild RAID Extent Selection Logic 154 may calculate the relatedness score for each one of the RAID extents in the candidate set at least in part by creating a candidate concurrent rebuild list for each one of the RAID extents in the candidate set. The candidate concurrent rebuild list for a given one of the RAID extents in the candidate set is made up of that RAID extent and the RAID extents remaining in the concurrent rebuild list. Concurrent Rebuild RAID Extent Selection Logic 154 may then calculate a write score for the RAID extent that is equal to a total number of pairs of spare drive extents in which both spare drive extents of the pair are both i) allocated to the RAID extents in the candidate concurrent rebuild list, and ii) located within a single one of the physical drives. Concurrent Rebuild RAID Extent Selection Logic 154 may then calculate the relatedness score for the RAID extent based at least in part on the write score for the RAID extent.

In some embodiments, Concurrent Rebuild RAID Extent Selection Logic 154 may further calculate the relatedness score for each one of the RAID extents in the candidate set at least in part by calculating a read score for the RAID extent that is equal to a number of pairs of drive extents in which both drive extents of the pair are both i) indicated by the RAID extents in the candidate concurrent rebuild list, and ii) located within a single one of the physical drives. The Concurrent Rebuild RAID Extent Selection Logic 154 may then calculate the relatedness score for the candidate RAID extent by generating a sum of the write score for the RAID extent and the read score for the RAID extent.

In some embodiments, Concurrent Rebuild RAID Extent Selection Logic 154 may also, prior to generating the sum of the write score for the candidate RAID extent and the read score for the candidate RAID extent, apply a predetermined write score weighting to the write score for the candidate RAID extent. The predetermined write score weighting causes the write score for the candidate RAID extent to be more heavily weighted than the read score for the candidate RAID extent in the relatedness score for the candidate RAID extent. For example, applying the predetermined write score weighting to the write score for a candidate RAID extent may consist of or include multiplying the write score by a predetermined integer factor (e.g. 2).

Figure 2:
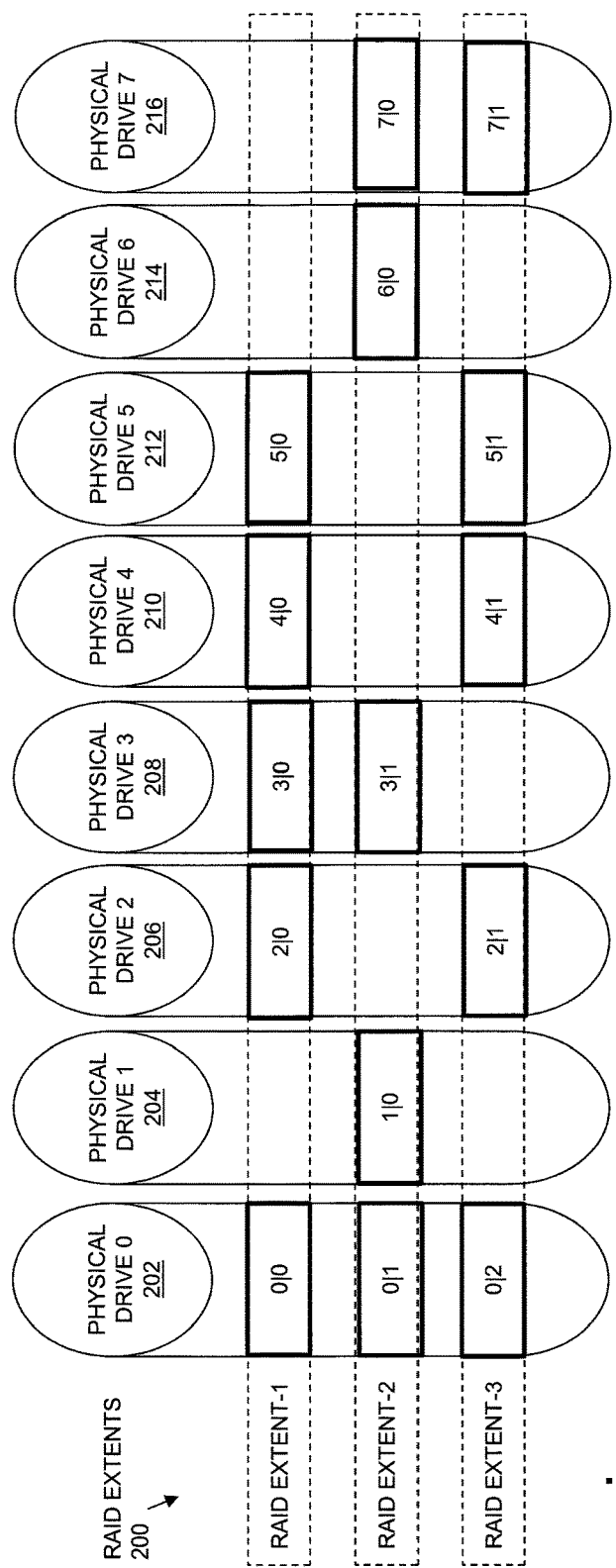
FIG. 2 is a block diagram showing an example of RAID extents in an illustrative embodiment providing 4D+1P RAID-5.

FIG. 2 is a block diagram showing an illustrative example of RAID Extents 200, as may be contained in the RAID Mapping Table 138 of FIG. 1 in embodiments that provide 4D+1P RAID-5 striping and data protection. As shown in the example of FIG. 2, RAID Extents 200 include a first RAID Extent-1, a second RAID Extent-2, a third RAID Extent-3, and so on. In order to provide 4D+1P RAID-5, each RAID extent in RAID Extents 200 indicates five drive extents. RAID Extent-1 indicates a first drive extent 0|0, which is the first drive extent in Physical Drive 0 202, a second drive extent 2|0, which is the first drive extent in Physical Drive 2 206, a third drive extent 3|0, which is the first drive extent in Physical Drive 3 208, a fourth drive extent 4|0, which is the first drive extent in Physical Drive 4 210, and a fifth drive extent 5|0, which is the first drive extent in Physical Drive 5 212.

RAID Extent-2 indicates a first drive extent 0|1, which is the second drive extent in Physical Drive 0 202, a second drive extent 1|0, which is the first drive extent in Physical Drive 1 204, a third drive extent 3|1, which is the second drive extent in Physical Drive 3 208, a fourth drive extent 6|0, which is the first drive extent in Physical Drive 6 214, and a fifth drive extent 7|0, which is the first drive extent in Physical Drive 7 216.

RAID Extent-3 indicates a first drive extent 0|2, which is the third drive extent in Physical Drive 0 202, a second drive extent 2|1, which is the second drive extent in Physical Drive 2 206, a third drive extent 4|1, which is the second drive extent in Physical Drive 4 210, a fourth drive extent 5|1, which is the second drive extent in Physical Drive 5 212, and a fifth drive extent 711, which is the second drive extent in Physical Drive 7 216.

FIG. 3 shows a Table 300 illustrating an example of a use case during operation of some embodiments of the disclosed technology. Each row in the example of Table 300 may correspond to one of the RAID extents in the RAID Mapping Table 138, and indicates the indices of the physical drives that contain the drive extents indicated by that RAID extent. In the example of Table 300, RAID extent 0 indicates a first drive extent located on physical drive number 0, a second drive extent located on physical drive number 2, a third drive extent located on physical drive number 3, a fourth drive extent on physical drive number 4, and a fifth drive extent located on physical drive number 5.

Further in the example of Table 300, RAID extent 1 indicates a first drive extent located on physical drive number 1, a second drive extent located on physical drive number 6, a third drive extent located on physical drive number 7, a fourth drive extent on physical drive number 0, and a fifth drive extent located on physical drive number 3.

Further in the example of Table 300, RAID extent 2 indicates a first drive extent located on physical drive number 2, a second drive extent located on physical drive number 4, a third drive extent located on physical drive number 0, a fourth drive extent on physical drive number 4, and a fifth drive extent located on physical drive number 7.

Further in the example of Table 300, RAID extent 3 indicates a first drive extent located on physical drive number 6, a second drive extent located on physical drive number 3, a third drive extent located on physical drive number 5, a fourth drive extent on physical drive number 1, and a fifth drive extent located on physical drive number 0.

Further in the example of Table 300, RAID extent 4 indicates a first drive extent located on physical drive number 4, a second drive extent located on physical drive number 2, a third drive extent located on physical drive number 3, a fourth drive extent on physical drive number 5, and a fifth drive extent located on physical drive number 1.

Further in the example of Table 300, RAID extent 5 indicates a first drive extent located on physical drive number 0, a second drive extent located on physical drive number 7, a third drive extent located on physical drive number 6, a fourth drive extent on physical drive number 4, and a fifth drive extent located on physical drive number 3.

Further in the example of Table 300, RAID extent 6 indicates a first drive extent located on physical drive number 3, a second drive extent located on physical drive number 1, a third drive extent located on physical drive number 4, a fourth drive extent on physical drive number 2, and a fifth drive extent located on physical drive number 6.

Further in the example of Table 300, RAID extent 7 indicates a first drive extent located on physical drive number 7, a second drive extent located on physical drive number 0, a third drive extent located on physical drive number 1, a fourth drive extent on physical drive number 6, and a fifth drive extent located on physical drive number 5.

Further in the example of Table 300, RAID extent 8 indicates a first drive extent located on physical drive number 6, a second drive extent located on physical drive number 1, a third drive extent located on physical drive number 2, a fourth drive extent on physical drive number 0, and a fifth drive extent located on physical drive number 4.

Further in the example of Table 300, RAID extent 9 indicates a first drive extent located on physical drive number 7, a second drive extent located on physical drive number 4, a third drive extent located on physical drive number 1, a fourth drive extent on physical drive number 3, and a fifth drive extent located on physical drive number 2.

For purposes of explanation and clear illustration, the indices of each drive extent within its respective physical drive are not shown in Table 300 in FIG. 3, though such indices are also maintained for each drive extent in RAID Mapping Table 138.

Table 300 illustrates an example of operation the disclosed technology after an indication (e.g. Drive Failure Notification 160) is received by Drive Failure Logic 150 that a physical drive number 0 in the Set of Physical Drives 130 has failed. Drive Failure Logic 150 operates to identify those RAID extents in RAID Mapping Table 138 that indicate drive extents located on physical drive number 0. In the example of Table 300, Drive Failure Logic 150 identifies RAID extents including RAID extents 0, 1, 2, 3, 5, 7 and 8 as RAID extents that indicate drive extents located on physical drive number 0. Drive Failure Logic 150 then allocates a spare drive extent (e.g. from Spare Drive Extents 133) to each one of the RAID extents in RAID Mapping Table 138 that indicate a drive extent located on physical drive number 0, in order to replace the drive extents located on physical drive number 0, which are greyed out in Table 300 to indicate that physical drive number 0 has failed. For example, in the example of Table 300, Drive Failure Logic 150 allocates a spare drive extent located in physical drive number 1 to RAID extent 0, a spare drive extent located in physical drive number 2 to RAID extent 1, a spare drive extent located in physical drive number 3 to RAID extent 2, a spare drive extent located in physical drive number 2 to RAID extent 3, a spare drive extent located in physical drive number 1 to RAID extent 5, a spare drive extent located in physical drive number 4 to RAID extent 7, and a spare drive extent located in physical drive number 5 to RAID extent 8.

Figure 4:
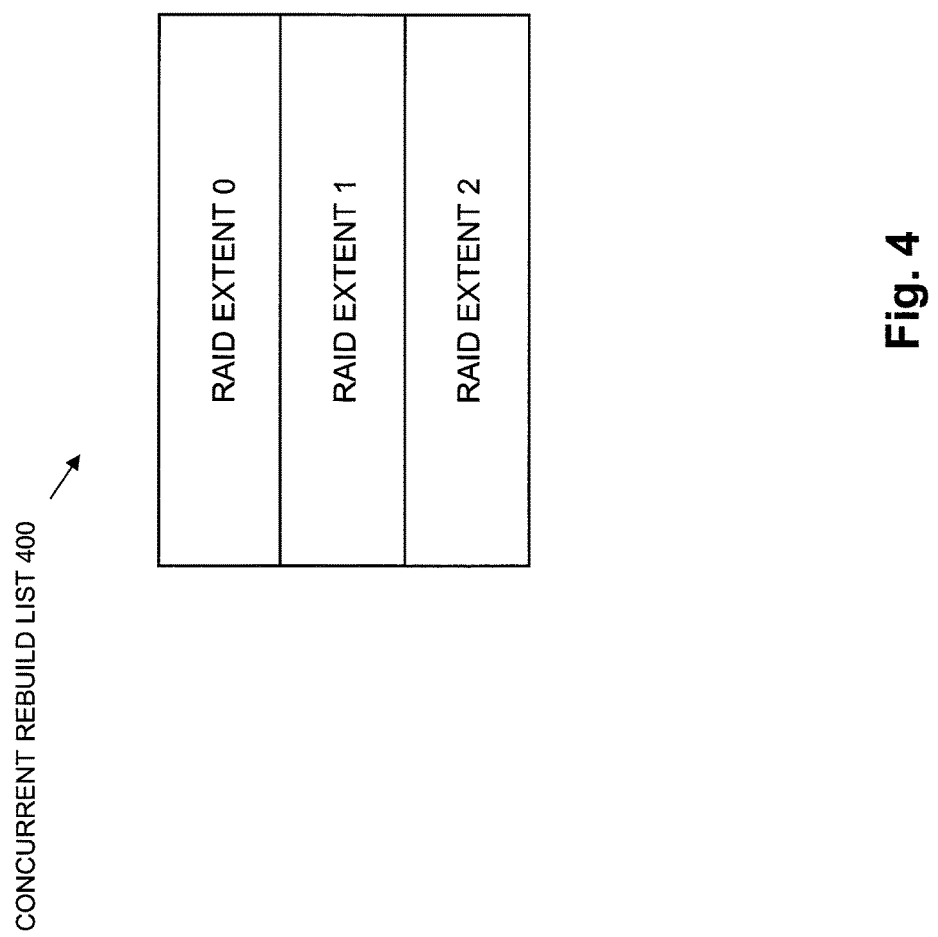
FIG. 4 is block diagram showing an example of a concurrent rebuild list generated during operation of some embodiments of the disclosed technology in connection with the use case illustrated by FIG. 3.

Further in the example of Table 300, in response to detecting that physical drive number 0 has failed, Drive Failure Logic 160 causes Concurrent RAID Extent Rebuilding Logic 162 to begin concurrently rebuilding RAID extents in RAID Mapping Table 138 that are indicated by the initial set of RAID extents in the Concurrent Rebuild List 400 shown in FIG. 4, which are the lowest numbered RAID extents in RAID Mapping Table 138 that indicate a drive extent located in physical drive number 0, i.e. RAID extent 0, RAID extent 1 and RAID extent 2. Concurrent RAID Extent Rebuilding Logic 162 then concurrently rebuilds each RAID extents indicated by Concurrent Rebuild List 400 by i) recovering host data previously stored in the drive extent of the failed one of the physical drives indicated by that RAID extent, and ii) writing the recovered host data to the spare drive extent allocated to the RAID extent.

Accordingly, in the example of Table 300, in embodiments using 4D+1P RAID-5 striping and data protection, Concurrent RAID Extent Rebuilding Logic 162 rebuilds RAID extent 0 by reading the second, third, fourth and fifth drive extents indicated by RAID extent 0, and performing XOR operations on the data read from the second, third, fourth and fifth drive extents indicated by RAID extent 0 in order to recover the host data previously stored on the first drive extent indicated by RAID extent 0. The host data recovered in this way is then written to the spare drive extent located on physical drive number 1 that was allocated to RAID extent 0, and RAID extent 0 is modified to indicate the spare drive extent located on physical drive number 1 that was allocated to RAID extent 0 as a first drive extent. At that point, the rebuilding of RAID extent 0 is considered complete.

Concurrent RAID Extent Rebuilding Logic 162 rebuilds RAID extent 1 by reading the first, second, third, and fifth drive extents indicated by RAID extent 1, and performing XOR operations on the data read from the first, second, third, and fifth drive extents indicated by RAID extent 1 in order to recover the host data previously stored on the fourth drive extent indicated by RAID extent 1. The host data recovered in this way is then written to the spare drive extent located on physical drive number 2 that was allocated to RAID extent 1, and RAID extent 1 is modified to indicate the spare drive extent located on physical drive number 2 that was allocated to RAID extent 1 as a fourth drive extent. At that point, the rebuilding of RAID extent 1 is considered complete.

Concurrent RAID Extent Rebuilding Logic 162 rebuilds RAID extent 2 by reading the first, second, fourth, and fifth drive extents indicated by RAID extent 2, and performing XOR operations on the data read from the first, second, fourth, and fifth drive extents indicated by RAID extent 2 in order to recover the host data previously stored on the third drive extent indicated by RAID extent 2. The host data recovered in this way is then written to the spare drive extent located on physical drive number 3 that was allocated to RAID extent 2, and RAID extent 2 is modified to indicate the spare drive extent located on physical drive number 3 that was allocated to RAID extent 2 as a third drive extent. At that point, the rebuilding of RAID extent 1 is considered complete.

While concurrently rebuilding RAID extents 0, 1, and 2, Concurrent RAID Extent Rebuilding Logic 162 may concurrently read drive extents indicated by different ones of RAID extents 0, 1, and 2, that are located on different physical drives. For example, Concurrent RAID Extent Rebuilding Logic 162 may concurrently read data from the second drive extent indicated by RAID extent 0 and from the first drive extent indicated by RAID extent 1, since those two drive extents are located on different physical drives (i.e.

drive number 2 and drive number 1). In another example Concurrent RAID Extent Rebuilding Logic 162 may concurrently read data from the second drive extent indicated by RAID extent 1 and from the first drive extent indicated by RAID extent 2, since those two drive extents are also located on different physical drives (i.e. drive number 6 and drive number 2). Such concurrently performed read operations may improve rebuild performance by reducing total rebuild time following the failure of a physical drive. However, when two drive extents are located on the same physical drive, it may not be possible to perform the reads to those two drive extents concurrently, and thus the amount of concurrent processing that may be performed during the rebuild process may be limited. Accordingly, the disclosed technology advantageously operates to reduce the number of pairs of drive extents indicated by the RAID extents in the concurrent rebuild list that are located on the same physical drive.

Also while concurrently rebuilding RAID extents 0, 1, and 2, Concurrent RAID Extent Rebuilding Logic 162 may concurrently write spare drive extents allocated to different ones of RAID extents 0, 1, and 2, that are located on different physical drives. For example, Concurrent RAID Extent Rebuilding Logic 162 may concurrently write recovered host data to the spare drive extent allocated to RAID extent 0, and to the spare drive extent allocated to RAID extent 1, since those two spare drive extents are located on different physical drives (i.e. drive number 1 and drive number 2). In another example, Concurrent RAID Extent Rebuilding Logic 162 may concurrently write recovered host data to the spare drive extent allocated to RAID extent 1, and to the spare drive extent allocated to RAID extent 2, since those two spare drive extents are located on different physical drives (i.e. drive number 2 and drive number 3). Such concurrently performed write operations may improve rebuild performance by reducing total rebuild time following the failure of a physical drive. However, when two spare drive extents are located on the same physical drive, it may not be possible to perform the writes to those two drive extents concurrently, and thus the amount of concurrent processing that may be performed during the rebuild process may be limited. Accordingly, the disclosed technology advantageously operates to reduce the number of pairs of spare drive extents allocated to the RAID extents in the concurrent rebuild list that are located on the same physical drive.

Figure 5:
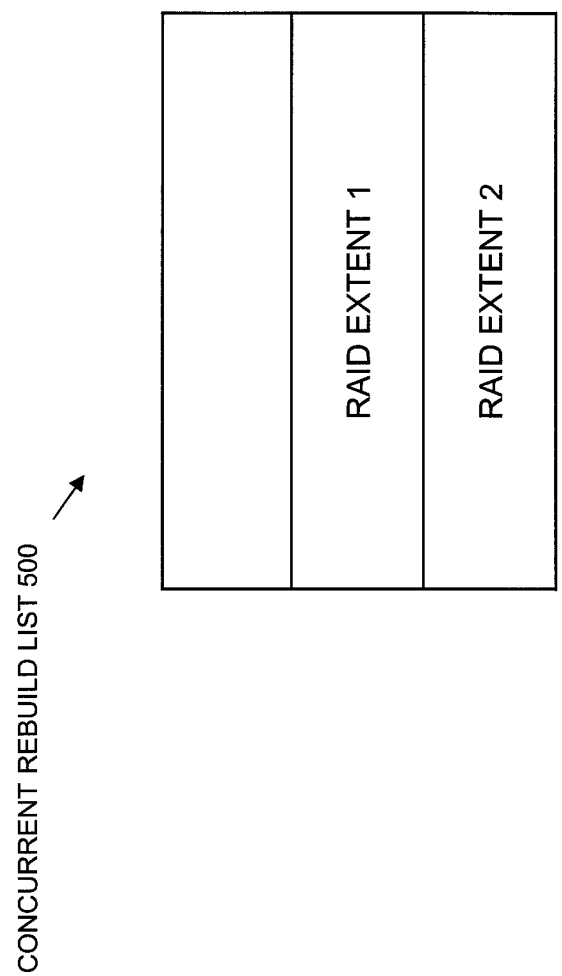
FIG. 5 is a block diagram showing an example of a concurrent rebuild list generated during operation of some embodiments of the disclosed technology in connection with the use case illustrated by FIG. 3, after removal of a RAID extent for which rebuilding has completed.

Rebuilding of individual RAID extents indicated by the Concurrent Rebuild List 400 may be completed at different times. Accordingly, rebuilding one of the RAID extents indicated by the Concurrent Rebuild List 400 may complete before the rebuilding of the other RAID extents indicated by the Concurrent Rebuild List 400. For example, rebuilding of RAID Extent 0 may be completed prior to completion of the rebuilding of RAID extent 1 or RAID extent 2. In such a case, Concurrent RAID Extent Rebuilding Logic 162 may remove RAID extent 0 from Concurrent Rebuild List 400, resulting in Concurrent Rebuild List 500 shown in FIG. 5, in which RAID extent 1 and RAID extent 2 are the remaining RAID extents after removal of RAID extent 0. Concurrent Rebuild RAID Extent Selection Logic 154 then operates to select a Next RAID Extent 156 to replace the RAID extent removed from Concurrent Rebuild List 500.

Figure 6:
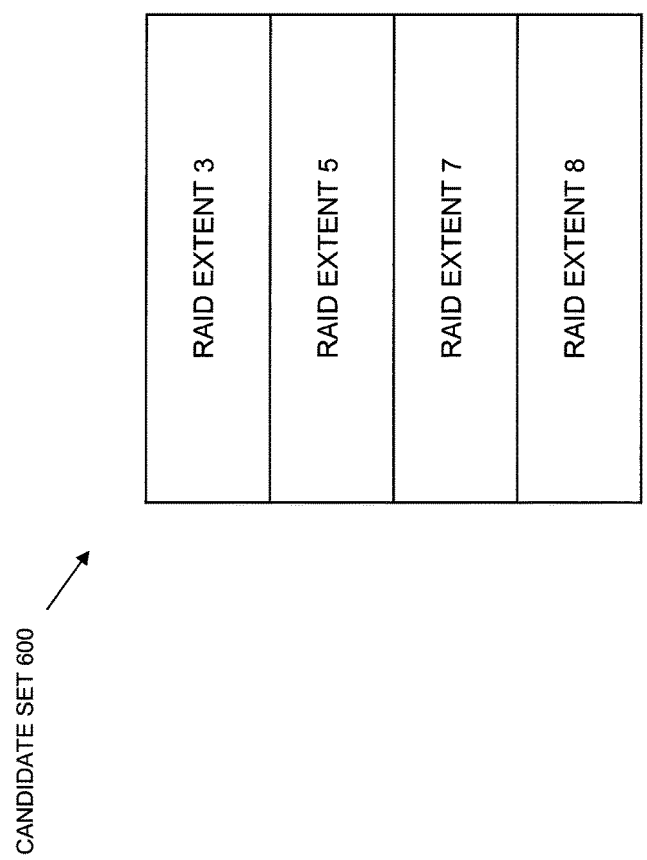
FIG. 6 is a block diagram showing an example of a candidate set generated during operation of some embodiments of the disclosed technology in connection with the use case illustrated by FIG. 3.

For example, Concurrent Rebuild RAID Extent Selection Logic 154 may select Next RAID Extent 156 by first forming a Candidate Set 600 (FIG. 6) consisting of RAID extents 3, 5, 7 and 8, which are the next RAID extents in RAID Mapping Table 138 that indicate a drive extent located in the failed physical drive (e.g. physical drive 0), and that have not previously been rebuilt. Concurrent Rebuild RAID Extent Selection Logic 154 then calculates a relatedness score for each RAID extent in the Candidate Set 600 (e.g. RAID extents 3, 5, 7 and 8) with respect to the remaining RAID extents shown in the Concurrent Rebuild List 500 (RAID extents 1 and 2). The relatedness score for each RAID extent in the Candidate Set 600 indicates an amount of limitation with regard to concurrently rebuilding that RAID extent in combination with the RAID extents remaining in the Concurrent Rebuild List 500. A lower relatedness score indicates a lower amount of limitation with regard to concurrently rebuilding a RAID extent in combination with the RAID extents remaining in the Concurrent Rebuild List 500.

Figure 7:
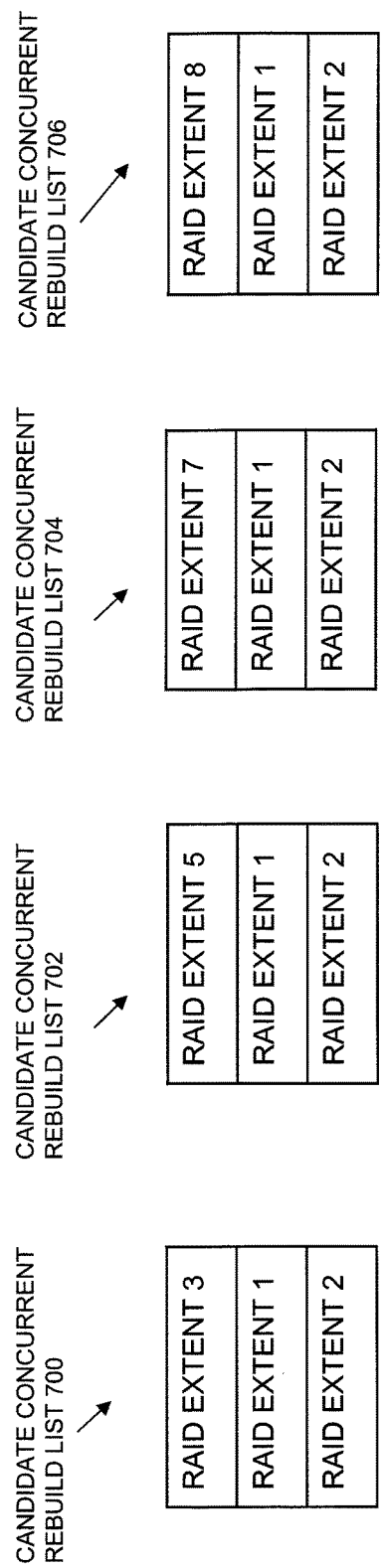
FIG. 7 is a block diagram showing examples of candidate concurrent rebuild lists generated during operation of some embodiments of the disclosed technology in connection with the use case illustrated by FIG. 3.

For example, Concurrent Rebuild RAID Extent Selection Logic 154 may calculate the relatedness score for each one of the RAID extents Candidate Set 600 at least in part by creating a candidate concurrent rebuild list for each one of the RAID extents in the Candidate Set 600. The candidate concurrent rebuild list for a given one of the RAID extents in Candidate Set 600 is made up of that RAID extent and the RAID extents remaining in the Concurrent Rebuild List 500. For example, FIG. 7 shows a Candidate Concurrent Rebuild List 700 for RAID extent 3, a Candidate Concurrent Rebuild List 702 for RAID extent 5, a Candidate Concurrent Rebuild List 704 for RAID extent 7, and a Candidate Concurrent Rebuild List 706 for RAID extent 8.

Concurrent Rebuild RAID Extent Selection Logic 154 may then use the candidate concurrent rebuild list for each RAID extent in the Candidate Set 600 to calculate a relatedness score. For each RAID extent in the Candidate Set 600, the relatedness score is equal to a sum of a weighted write score and a read score. The write score for a RAID extent in the Candidate Set 600 is calculated as a total number of pairs of spare drive extents allocated to RAID extents in the candidate concurrent rebuild list for that RAID extent, in which the spare drive extents in the pair are both located within a single physical drive. The read score for a RAID extent in the Candidate Set 600 is calculated as a total number of pairs of drive extents indicated by RAID extents in the candidate rebuild list for that RAID extent, in which the drive extents in the pair are both located within a single physical drive. The write score for a RAID extent in the Candidate Set 600 may be multiplied by an integer weighting factor (e.g. 2), prior to calculating the sum of the write score and the read score for the RAID extent, in order to emphasize the importance of providing concurrency of write operations during the rebuild process.

For example, for RAID extent 3, having a Candidate Concurrent Rebuild List 700, the total number of pairs of spare drive extents allocated to RAID extents in the Candidate Concurrent Rebuild List 700 that are both located within a single physical drive is 1, because both the spare drive extent allocated to RAID extent 1 and the spare drive extent allocated to RAID extent 3 are located on physical drive 2. Accordingly, the write score for RAID extent 3 is 1. Weighting the write score for RAID extent 3 by a factor of 2 results in a weighted write score for RAID extent 3 of 2.

With regard to calculating a read score for RAID extent 3, the total number of pairs of drive extents indicated by RAID extents in the Candidate Concurrent Rebuild List 700 that are both located within a single physical drive is 5, because both the fourth drive extent allocated to RAID extent 3 and the first drive extent indicated by RAID extent 1 are located on physical drive 1, both the third drive extent allocated to RAID extent 3 and the second drive extent indicated by RAID extent 2 are located on physical drive 5, both the second drive extent allocated to RAID extent 3 and the fifth drive extent indicated by RAID extent 1 are located on physical drive 3, both the first drive extent allocated to RAID extent 3 and the second drive extent indicated by RAID extent 1 are located on physical drive 1, and both the fifth drive extent allocated to RAID extent 2 and the third drive extent indicated by RAID extent 1 are located on physical drive 7. Summing the weighted write score (2) and the read score (5) for RAID extent 3 results in a relatedness score of 7 for RAID extent 3, as shown in the Table 300 of FIG. 3.

For RAID extent 5, having a Candidate Concurrent Rebuild List 702, the total number of pairs of spare drive extents allocated to RAID extents in the Candidate Concurrent Rebuild List 700 that are both located within a single physical drive is 0, because none of the spare drive extents allocated to RAID extent 5, RAID extent 1, or RAID extent 2 are located on the same physical drive. Accordingly, the write score for RAID extent 5 is 0, and weighting the write score for RAID extent 5 by a factor of 2 results in a weighted write score for RAID extent 5 of 0.

With regard to calculating a read score for RAID extent 5, the total number of pairs of drive extents indicated by RAID extents in the Candidate Concurrent Rebuild List 702 that are both located within a single physical drive is 6, because both the fifth drive extent allocated to RAID extent 5 and the fifth drive extent indicated by RAID extent 1 are located on physical drive 3, both the fourth drive extent allocated to RAID extent 5 and the fourth drive extent indicated by RAID extent 2 are located on physical drive 4, both the third drive extent allocated to RAID extent 5 and the second drive extent indicated by RAID extent 1 are located on physical drive 6, both the second drive extent allocated to RAID extent 5 and the third drive extent indicated by RAID extent 1 are located on physical drive 7, both the second drive extent allocated to RAID extent 5 and the fifth drive extent indicated by RAID extent 2 are located on physical drive 7, and both the fifth drive extent allocated to RAID extent 2 and the third drive extent indicated by RAID extent 1 are located on physical drive 7. Summing the weighted write score (0) and the read score (6) for RAID extent 5 results in a relatedness score of 6 for RAID extent 5, as shown in the Table 300 of FIG. 3.

For RAID extent 7, having a Candidate Concurrent Rebuild List 704, the total number of pairs of spare drive extents allocated to RAID extents in the Candidate Concurrent Rebuild List 704 that are both located within a single physical drive is 0, because none of the spare drive extents allocated to RAID extent 7, RAID extent 1, or RAID extent 2 are located on the same physical drive. Accordingly, the write score for RAID extent 7 is 0, and weighting the write score for RAID extent 7 by a factor of 2 results in a weighted write score for RAID extent 7 of 0.

With regard to calculating a read score for RAID extent 7, the total number of pairs of drive extents indicated by RAID extents in the Candidate Concurrent Rebuild List 704 that are both located within a single physical drive is 5, reflecting the facts that both the fifth drive extent allocated to RAID extent 7 and the second drive extent indicated by RAID extent 2 are located on physical drive 5, both the sixth drive extent allocated to RAID extent 7 and the second drive extent indicated by RAID extent 1 are located on physical drive 6, both the third drive extent allocated to RAID extent 7 and the first drive extent indicated by RAID extent 1 are located on physical drive 1, both the first drive extent allocated to RAID extent 7 and the third drive extent indicated by RAID extent 1 are located on physical drive 7, and both the fifth drive extent allocated to RAID extent 2 and the third drive extent indicated by RAID extent 1 are located on physical drive 7. Summing the weighted write score (0) and the read score (5) for RAID extent 7 results in a relatedness score of 5 for RAID extent 7, as shown in the Table 300 of FIG. 3.

For RAID extent 8, having a Candidate Concurrent Rebuild List 706, the total number of pairs of spare drive extents allocated to RAID extents in the Candidate Concurrent Rebuild List 706 that are both located within a single physical drive is 0, because none of the spare drive extents allocated to RAID extent 8, RAID extent 1, or RAID extent 2 are located on the same physical drive. Accordingly, the write score for RAID extent 8 is 0, and weighting the write score for RAID extent 8 by a factor of 2 results in a weighted write score for RAID extent 8 of 0.

With regard to calculating a read score for RAID extent 8, the total number of pairs of drive extents indicated by RAID extents in the Candidate Concurrent Rebuild List 706 that are both located within a single physical drive is 5, reflecting the facts that both the fifth drive extent allocated to RAID extent 8 and the fourth drive extent indicated by RAID extent 2 are located on physical drive 4, both the third drive extent allocated to RAID extent 8 and the first drive extent indicated by RAID extent 2 are located on physical drive 2, both the second drive extent allocated to RAID extent 8 and the first drive extent indicated by RAID extent 1 are located on physical drive 1, both the first drive extent allocated to RAID extent 8 and the second drive extent indicated by RAID extent 1 are located on physical drive 6, and both the fifth drive extent allocated to RAID extent 2 and the third drive extent indicated by RAID extent 1 are located on physical drive 7. Summing the weighted write score (0) and the read score (5) for RAID extent 8 results in a relatedness score of 5 for RAID extent 8, as shown in the Table 300 of FIG. 3.

Figure 8:
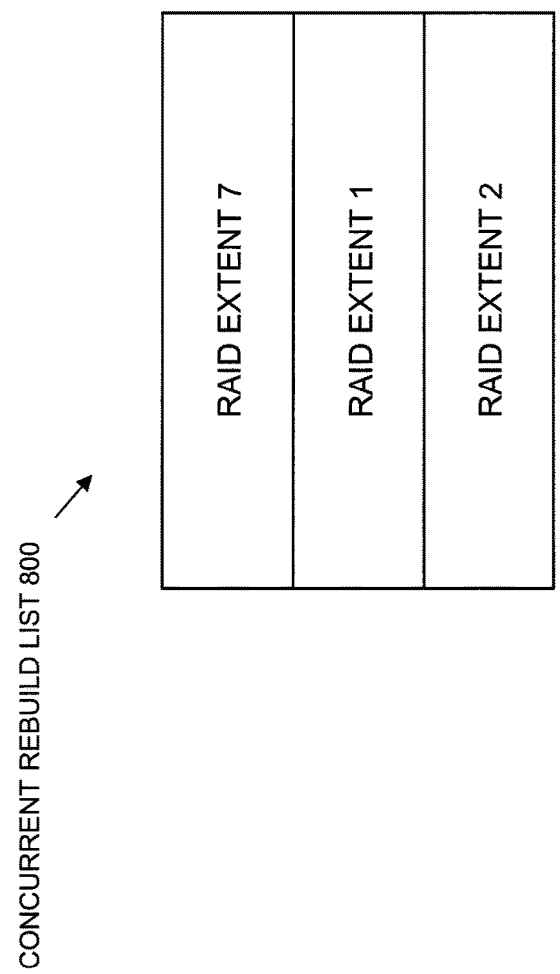
FIG. 8 is a block diagram showing an example of a concurrent rebuild list generated during operation of some embodiments of the disclosed technology in connection with the use case illustrated by FIG. 3, after a new RAID extent has been selected to replace the RAID extent that was previously removed.

The Concurrent Rebuild RAID Extent Selection Logic 154 then selects as the RAID extent (e.g. Next RAID Extent 156 in FIG. 1) to replace the RAID extent previously removed from Concurrent Rebuild List 500, a RAID extent in Candidate Set 600 having the lowest relatedness score of all the RAID extents in Candidate Set 600. In the example of FIG. 3 and as described above, RAID extent 3 has a relatedness score of 7, RAID extent 5 has a relatedness score of 6, RAID extent 7 has a relatedness score of 5, and RAID extent 8 has a relatedness score of 5. Accordingly, both RAID extent 7 and RAID extent 8 have the same relatedness score of 5, and 5 is the lowest relatedness score of all the RAID extents in the Candidate Set 600. In the event of such a tie between relatedness scores, a tie breaker function may be applied to determine which RAID extent to use to replace the previously removed RAID extent in Concurrent Rebuild List 500. For example, a RAID extent with the lowest RAID extent index may be selected from the RAID extents with the lowest relatedness scores in the Candidate Set 600 as the RAID extent to use to replace the previously removed RAID extent. In such an embodiment, RAID extent 7 would be selected as the RAID extent to replace the previously removed RAID extent, resulting in a Concurrent Rebuild List 800 that includes RAID extent 7, RAID extent 1, and RAID extent 2, as shown in FIG. 8.

Figure 9:
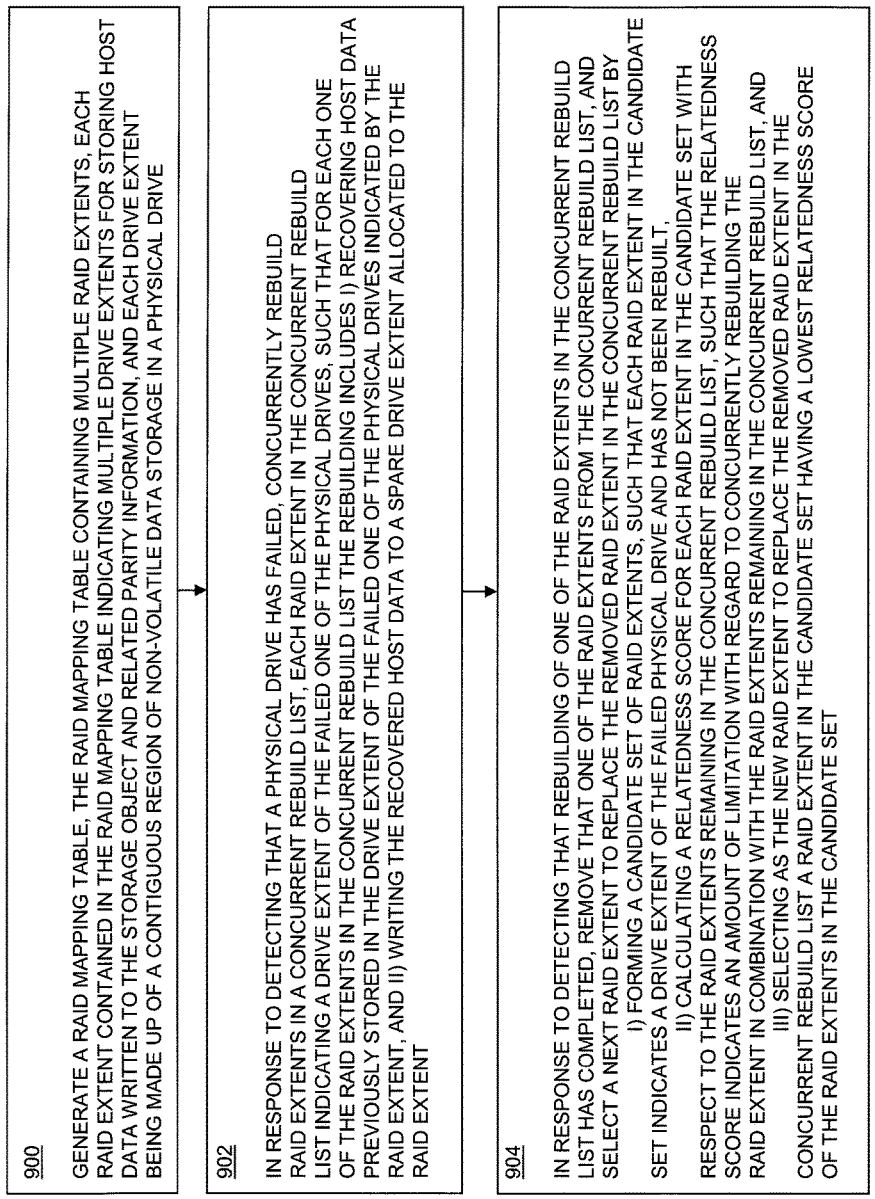
FIG. 9 is a flow chart showing an example of steps performed during operation of some embodiments of the disclosed technology.

FIG. 9 is a flow chart showing an example of steps performed during operation of some embodiments of the disclosed technology. At step 900, a RAID mapping table is generated that contains multiple RAID extents. Each RAID extent contained in the RAID mapping table indicates multiple drive extents for storing host data written to the storage object and related parity information, and each drive extent is made up of a contiguous region of non-volatile data storage in a physical drive within a set of physical drives.

At step 902, in response to detecting that one of the physical drives in the set of physical drives has failed, RAID extents in a concurrent rebuild list are concurrently rebuilt. Each RAID extent in the concurrent rebuild list indicates a drive extent located in the failed physical drives. The concurrent rebuilding is performed such that for each one of the RAID extents in the concurrent rebuild list the rebuilding includes i) recovering host data previously stored in the drive extent of the failed physical drive indicated by the RAID extent, and ii) writing the recovered host data to a spare drive extent allocated to the RAID extent.

At step 904, in response to detecting that rebuilding of one of the RAID extents in the concurrent rebuild list has completed, that one of the RAID extents is removed from the concurrent rebuild list, and a next RAID extent to replace the removed RAID extent in the concurrent rebuild list is selected by i) forming a candidate set of RAID extents, such that each RAID extent in the candidate set indicates a drive extent of the failed physical drive and has not been rebuilt, ii) calculating a relatedness score for each RAID extent in the candidate set with respect to the RAID extents remaining in the concurrent rebuild list, such that the relatedness score indicates an amount of limitation with regard to concurrently rebuilding the RAID extent in combination with the RAID extents remaining in the concurrent rebuild list, and iii) selecting a RAID extent in the candidate set having the lowest relatedness score of the RAID extents in the candidate set as the new RAID extent to replace the previously removed RAID extent in the concurrent rebuild list.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing RAID (Redundant Array of Independent Disks) data protection for a storage object in a data storage system, wherein the data storage system includes a storage processor and a set of physical drives communicably coupled to the storage processor, the method comprising:

generating a RAID mapping table, wherein the RAID mapping table contains a plurality of RAID extents, wherein each RAID extent contained in the RAID mapping table indicates a plurality of drive extents for storing host data written to the storage object and related parity information, and wherein each drive extent comprises a contiguous region of non-volatile data storage in one of the physical drives;

in response to detecting that one of the physical drives has failed, concurrently rebuilding RAID extents in a concurrent rebuild list, wherein each RAID extent in the concurrent rebuild list indicates a drive extent of the failed one of the physical drives, and wherein for each one of the RAID extents in the concurrent rebuild list rebuilding includes i) recovering host data previously stored in the drive extent of the failed one of the physical drives indicated by the RAID extent, and ii) writing the recovered host data to a spare drive extent allocated to the RAID extent;

in response to detecting that rebuilding of one of the RAID extents in the concurrent rebuild list has completed, removing that one of the RAID extents from the concurrent rebuild list, and selecting a next RAID extent to replace the removed RAID extent in the concurrent rebuild list by i) forming a candidate set of RAID extents, wherein each RAID extent in the candidate set indicates a drive extent of the failed physical drive and has not been rebuilt, ii) calculating a relatedness score for each RAID extent in the candidate set with respect to the RAID extents remaining in the concurrent rebuild list, wherein the relatedness score indicates an amount of limitation with regard to concurrently rebuilding the RAID extent in combination with the RAID extents remaining in the concurrent rebuild list, and iii) selecting as the new RAID extent to replace the removed RAID extent in the concurrent rebuild list a RAID extent in the candidate set having a lowest relatedness score of the RAID extents in the candidate set.

2. The method of claim 1, wherein calculating the relatedness score for each RAID extent in the candidate set further comprises:

creating a candidate concurrent rebuild list for the RAID extent made up of the RAID extent and the RAID extents remaining in the concurrent rebuild list;

calculating a write score for the RAID extent that is equal to a total number of pairs of spare drive extents in which both spare drive extents of the pair are both i) allocated to the RAID extents in the candidate concurrent rebuild list, and ii) located within a single one of the physical drives; and wherein calculating the relatedness score for the RAID extent is based at least in part on the write score for the RAID extent.

3. The method of claim 2, wherein calculating the relatedness score for each RAID extent in the candidate set further comprises:

calculating a read score for the RAID extent that is equal to a number of pairs of drive extents in which both drive extents of the pair are both i) indicated by the RAID extents in the candidate concurrent rebuild list, and ii) located within a single one of the physical drives; and wherein calculating the relatedness score for the RAID extent comprises generating a sum of the write score for the RAID extent and the read score for the RAID extent.

4. The method of claim 3, further comprising prior to generating the sum of the write score for the RAID extent and the read score for the RAID extent, applying a predetermined write score weighting to the write score for the RAID extent, wherein the predetermined write score weighting causes the write score for the RAID extent to be more heavily weighted than the read score for the RAID extent in the relatedness score for the candidate RAID extent.

5. The method of claim 4, wherein concurrently rebuilding the RAID extents in the concurrent rebuild list comprises concurrently reading drive extents indicated by different ones of the RAID extents in the concurrent rebuild list to recover host data previously stored on drive extents of the failed one of the physical drives.

6. The method of claim 5, wherein concurrently rebuilding the RAID extents in the concurrent rebuild list comprises concurrently writing spare drive extents allocated to different ones of the RAID extents in the concurrent rebuild list with recovered host data previously stored on the drive extents of the failed one of the physical drives.

7. A data storage system that provides RAID (Redundant Array of Independent Disks) data protection for a storage object, comprising:

at least one storage processor including processing circuitry and a memory;

a set of physical drives communicably coupled to the storage processor; and wherein the storage processor is configured and arranged to:

generate a RAID mapping table, wherein the RAID mapping table contains a plurality of RAID extents, wherein each RAID extent contained in the RAID mapping table indicates a plurality of drive extents for storing host data written to the storage object and related parity information, and wherein each drive extent comprises a contiguous region of non-volatile data storage in one of the physical drives;

in response to detecting that one of the physical drives has failed, concurrently rebuild RAID extents in a concurrent rebuild list, wherein each RAID extent in the concurrent rebuild list indicates a drive extent of the failed one of the physical drives, and wherein each one of the RAID extents in the concurrent rebuild list is rebuilt at least in part by i) recovering host data previously stored in the drive extent of the failed one of the physical drives indicated by the RAID extent, and ii) writing the recovered host data to a spare drive extent allocated to the RAID extent;

in response to detecting that rebuilding of one of the RAID extents in the concurrent rebuild list has completed, remove that one of the RAID extents from the concurrent rebuild list, and select a next RAID extent to replace the removed RAID extent in the concurrent rebuild list by operating to i) form a candidate set of RAID extents, wherein each RAID extent in the candidate set indicates a drive extent of the failed physical drive and has not been rebuilt, ii) calculate a relatedness score for each RAID extent in the candidate set with respect to the RAID extents remaining in the concurrent rebuild list, wherein the relatedness score indicates an amount of limitation with regard to concurrently rebuilding the RAID extent in combination with the RAID extents remaining in the concurrent rebuild list, and iii) select as the new RAID extent to replace the removed RAID extent in the concurrent rebuild list a RAID extent in the candidate set having a lowest relatedness score of the RAID extents in the candidate set.

8. The data storage system of claim 7, wherein to calculate the relatedness score for each RAID extent in the candidate set the storage processor is further configured and arranged to:

create a candidate concurrent rebuild list for the RAID extent made up of the RAID extent and the RAID extents remaining in the concurrent rebuild list;

calculate a write score for the RAID extent that is equal to a total number of pairs of spare drive extents in which both spare drive extents of the pair are both i) allocated to the RAID extents in the candidate concurrent rebuild list, and ii) located within a single one of the physical drives; and calculate the relatedness score for the RAID extent at least in part based on the write score for the RAID extent.

9. The data storage system of claim 8, wherein to calculate the relatedness score for each RAID extent in the candidate set, the storage processor is further configured and arranged to:
calculate a read score for the RAID extent that is equal to a number of pairs of drive extents in which both drive extents of the pair are both i) indicated by the RAID extents in the candidate concurrent rebuild list, and ii) located within a single one of the physical drives; and
calculate the relatedness score for the RAID extent by generating a sum of the write score for the RAID extent and the read score for the RAID extent.

10. The data storage system of claim 9, wherein the storage processor is further configured and arranged to:
prior to generating the sum of the write score for the RAID extent and the read score for the RAID extent, apply a predetermined write score weighting to the write score for the RAID extent, wherein the predetermined write score weighting causes the write score for the RAID extent to be more heavily weighted than the read score for the RAID extent in the relatedness score for the candidate RAID extent.

11. The data storage system of claim 10, wherein the storage processor is further configured and arranged to concurrently rebuild the RAID extents in the concurrent rebuild list by operating to concurrently read drive extents indicated by different ones of the RAID extents in the concurrent rebuild list to recover host data previously stored on drive extents of the failed one of the physical drives.

12. The data storage system of claim 11, wherein the storage processor is further configured and arranged to concurrently rebuild the RAID extents in the concurrent rebuild list by operating to concurrently write spare drive extents allocated to different ones of the RAID extents in the concurrent rebuild list with recovered host data previously stored on the drive extents of the failed one of the physical drives.

13. A computer program product, comprising:
a non-transitory computer readable medium storing program code for providing RAID (Redundant Array of Independent Disks) data protection for a storage object in a data storage system, wherein the data storage system includes a storage processor and a set of non-volatile data storage devices communicably coupled to the storage processor, the set of instructions, when carried out by at least one processor in the storage processor, causing the storage processor to perform a method of:
generating a RAID mapping table, wherein the RAID mapping table contains a plurality of RAID extents, wherein each RAID extent contained in the RAID mapping table indicates a plurality of drive extents for storing host data written to the storage object and related parity information, and wherein each drive extent comprises a contiguous region of non-volatile data storage in one of the physical drives;
in response to detecting that one of the physical drives has failed, concurrently rebuilding RAID extents in a concurrent rebuild list, wherein each RAID extent in the concurrent rebuild list indicates a drive extent of the failed one of the physical drives, and wherein for each one of the RAID extents in the concurrent rebuild list rebuilding includes i) recovering host data previously stored in the drive extent of the failed one of the physical drives indicated by the RAID extent, and ii) writing the recovered host data to a spare drive extent allocated to the RAID extent;
in response to detecting that rebuilding of one of the RAID extents in the concurrent rebuild list has completed, removing that one of the RAID extents from the concurrent rebuild list, and selecting a next RAID extent to replace the removed RAID extent in the concurrent rebuild list by
i) forming a candidate set of RAID extents, wherein each RAID extent in the candidate set indicates a drive extent of the failed physical drive and has not been rebuilt,
ii) calculating a relatedness score for each RAID extent in the candidate set with respect to the RAID extents remaining in the concurrent rebuild list, wherein the relatedness score indicates an amount of limitation with regard to concurrently rebuilding the RAID extent in combination with the RAID extents remaining in the concurrent rebuild list, and
iii) selecting as the new RAID extent to replace the removed RAID extent in the concurrent rebuild list a RAID extent in the candidate set having a lowest relatedness score of the RAID extents in the candidate set.

14. The computer program product of claim 13, wherein the method performed by the storage processor when the set of instructions is carried out by at least one processor in the storage processor further comprises calculating the relatedness score for each RAID extent in the candidate set at least in part by:
creating a candidate concurrent rebuild list for the RAID extent made up of the RAID extent and the RAID extents remaining in the concurrent rebuild list;
calculating a write score for the RAID extent that is equal to a total number of pairs of spare drive extents in which both spare drive extents of the pair are both i) allocated to the RAID extents in the candidate concurrent rebuild list, and ii) located within a single one of the physical drives; and
wherein calculating the relatedness score for the RAID extent is based at least in part on the write score for the RAID extent.

15. The computer program product of claim 14, wherein the method performed by the storage processor when the set of instructions is carried out by at least one processor in the storage processor further comprises calculating the relatedness score for each RAID extent in the candidate set at least in part by:
calculating a read score for the RAID extent that is equal to a number of pairs of drive extents in which both drive extents of the pair are both i) indicated by the RAID extents in the candidate concurrent rebuild list, and ii) located within a single one of the physical drives; and
wherein calculating the relatedness score for the RAID extent comprises generating a sum of the write score for the RAID extent and the read score for the RAID extent.

16. The computer program product of claim 15, wherein the method performed by the storage processor when the set of instructions is carried out by at least one processor in the storage processor further comprises:
prior to generating the sum of the write score for the RAID extent and the read score for the RAID extent, applying a predetermined write score weighting to the write score for the RAID extent, wherein the predetermined write score weighting causes the write score for the RAID extent to be more heavily weighted than the read score for the RAID extent in the relatedness score for the candidate RAID extent.

17. The computer program product of claim 16, wherein the method performed by the storage processor when the set of instructions is carried out by at least one processor in the storage processor further comprises concurrently rebuilding the RAID extents in the concurrent rebuild list at least in part by concurrently reading drive extents indicated by different ones of the RAID extents in the concurrent rebuild list to recover host data previously stored on drive extents of the failed one of the physical drives.

18. The computer program product of claim 17, wherein the method performed by the storage processor when the set of instructions is carried out by at least one processor in the storage processor further comprises concurrently rebuilding the RAID extents in the concurrent rebuild list at least in part by concurrently writing spare drive extents allocated to different ones of the RAID extents in the concurrent rebuild list with recovered host data previously stored on the drive extents of the failed one of the physical drives.

* * * * *